US005517268A

United States Patent [19]

Stephany

[11] Patent Number: 5,517,268
[45] Date of Patent: May 14, 1996

[54] FILM CARTRIDGE WITH EXPOSED-FILM INDICATOR

[75] Inventor: Thomas M. Stephany, Churchville, N.Y.

[73] Assignee: Eastman Kodak Company, Rochester, N.Y.

[21] Appl. No.: 368,508

[22] Filed: Jan. 3, 1995

[51] Int. Cl.⁶ .......................... G03B 17/26; G03B 23/02
[52] U.S. Cl. ........................................... 354/272; 242/348
[58] Field of Search ................... 354/21, 275; 242/344, 242/357, 348–348.4

[56] References Cited

U.S. PATENT DOCUMENTS

| | | |
|---|---|---|
| 4,335,948 | 6/1982 | Cocco ................................. 354/275 |
| 4,860,037 | 8/1989 | Harvey ................................. 354/21 |
| 4,887,110 | 12/1989 | Harvey ............................... 254/275 |
| 4,903,053 | 2/1990 | Harvey ............................... 354/21 |
| 4,931,819 | 6/1990 | Atkinson et al. .................. 354/275 |
| 5,255,039 | 10/1993 | Miller ................................. 354/275 |
| 5,264,886 | 11/1993 | Byrd ................................... 354/275 |
| 5,296,887 | 3/1994 | Zander ................................ 354/275 |

Primary Examiner—Michael L. Gellner
Assistant Examiner—Eddie C. Lee
Attorney, Agent, or Firm—Roger A. Fields

[57] ABSTRACT

A film cartridge has a folded-over tab protruding from a film egress slot, which is unfolded by a film leader moving outwardly through the slot. The unfolded tab provides a visible indication of film use. In an alternate embodiment, the tab is an integral extension of a light-trapping plush that lines the film egress slot.

5 Claims, 4 Drawing Sheets

FILM CARTRIDGE WITH EXPOSED-FILM INDICATOR

CROSS-REFERENCE TO RELATED APPLICATION(S)

Reference is made to commonly assigned copending application Ser. No. 08/368,462, entitled FILM CARTRIDGE WITH FILM MOVEMENT INDICATOR, AND ASSOCIATED INDICATOR SENSING DEVICE and filed Jan. 3, 1995 in the name of Thomas M. Stephany, which is assigned to the assignee of this application.

FIELD OF THE INVENTION

The invention relates generally to the field of photography, and in particular to film cartridges. More specifically, the invention relates to a film cartridge with an exposed-film indicator.

BACKGROUND OF THE INVENTION

Prior art U.S. Pat. No. 5,296,887, issued Mar. 22, 1994, discloses a film cartridge comprising a cartridge shell having a film egress slot, a filmstrip located inside the cartridge shell with a film leader to be moved outwardly through the film egress slot, and film exposure status indicating means. The film exposure status indicating means includes a plurality of icon cut-outs in the cartridge shell which are uniquely shaped to be different from each other in order for one of the cut-outs to denote the filmstrip is fresh or unexposed and for another of the cut-outs to denote the filmstrip is exposed or used, and an indicator flag rotatably supported to be visible through only one of the cut-outs at a time to highlight the particular cut-out that indicates the current status of the filmstrip.

SUMMARY OF THE INVENTION

A film cartridge comprising a cartridge shell having a film egress slot, a filmstrip located inside the cartridge shell with a film leader to be moved outwardly through the film egress slot, and an exposed-film indicator, is characterized in that:

the exposed-film indicator includes folded-over resilient indicator means partly protruding from the film egress slot in the form of an external loop to be unfolded by the film leader as the film leader is moved outwardly from the film egress slot, whereby the loop when unfolded provides a visible indication of film use.

Preferably, the indicator means is a folded-over resilient tab having one end portion held in place inside the film egress slot and another end portion inside the film egress slot which is free to be dragged by the film leader to unfold the loop when the film leader is moved outwardly from the film egress slot.

Alternately, the indicator means can be an integral extension of a light-trapping plush having a free end portion positioned inside the film egress slot to be dragged by the film leader to unfold the loop when the film leader is moved outwardly from the film egress slot.

DETAILED DESCRIPTION OF THE INVENTION

The invention is disclosed as being embodied preferably in a 35 mm film cartridge. Because the features of a 35 mm film cartridge are generally known, the description which follows is directed in particular only to those elements forming part of or cooperating directly with the disclosed embodiment. It is to be understood, however, that other elements may take various forms known to a person of ordinary skill in the art.

Figure 1:
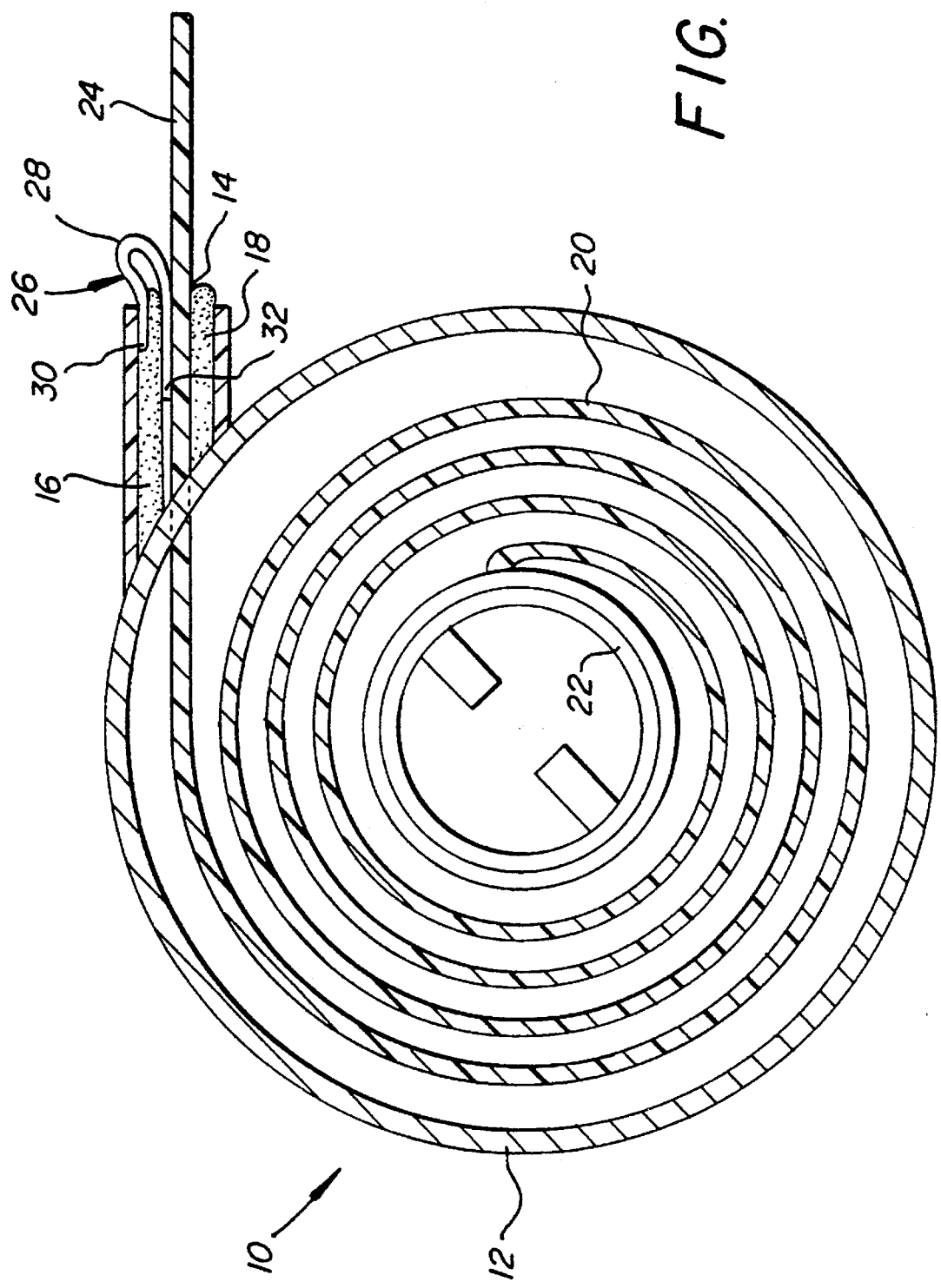
FIG. 1 is a cross-section view of a film cartridge with an exposed-film indicator according to a preferred embodiment of the invention, showing the exposed-film indicator in an original mode which indicates that a filmstrip inside the cartridge shell is fresh or unexposed.
Figure 2:
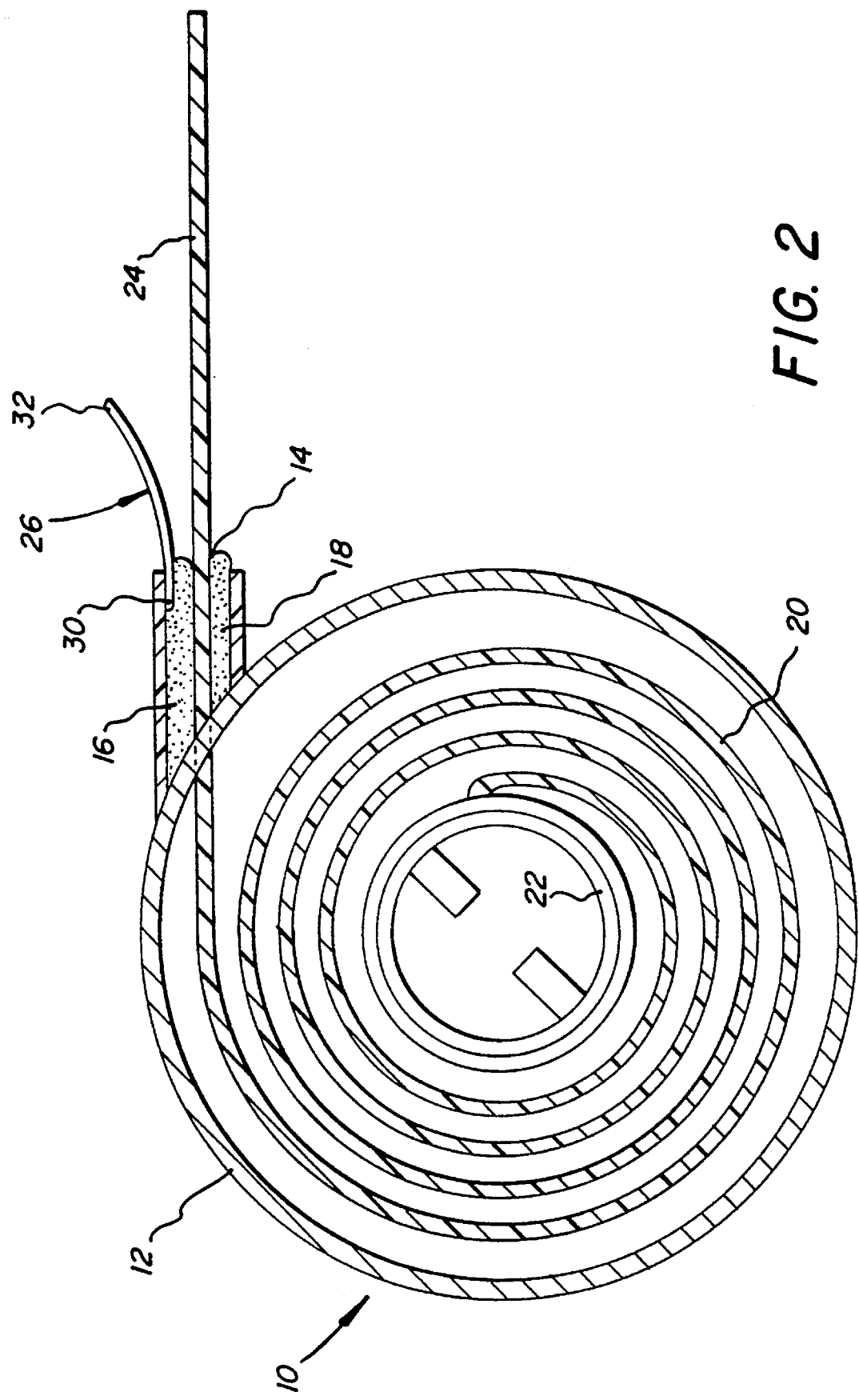
FIG. 2 is a cross-section view similar to FIG. 1, showing the exposed-film indicator in a second mode which indicates that the filmstrip inside the cartridge shell is exposed or used.

Referring now to the drawings, FIGS. 1 and 2 show a film cartridge 10 comprising a cartridge shell 12 having a film egress slot 14 lined with a pair of upper and lower light-trapping plush pads 16 and 18, and a filmstrip 20 coiled into a film roll about a film spool 22 rotatably supported inside the cartridge shell. The filmstrip 20 has an integral film leader 24 partly located inside the slot 14 between the upper and lower plush pads 16 and 18 and partly protruding from the slot as shown in FIG. 1. As is well known, the filmstrip 20 beginning with the film leader 24 is moved outwardly through the slot 14 to expose successive film frames in a camera.

According to a preferred embodiment of the invention, a folded-over resilient tab 26 partly protrudes from the slot 14 in the form of an external loop 28 with one end portion 30 secured in place inside the slot between the upper plush pad 16 and the cartridge shell 12 and another end portion 32 inside the slot between the upper plush pad and the film leader 24. The free end portion 32 of the tab 26 is free to be frictionally dragged by the film leader 24 to unfold the loop 28 as the film leader is moved outwardly from the slot. See FIG. 2. Thus, the loop 28 when originally folded provides a visible indication that the filmstrip 20 is fresh or unexposed and when unfolded provides a visible indication that the filmstrip is exposed or used.

Figure 3:
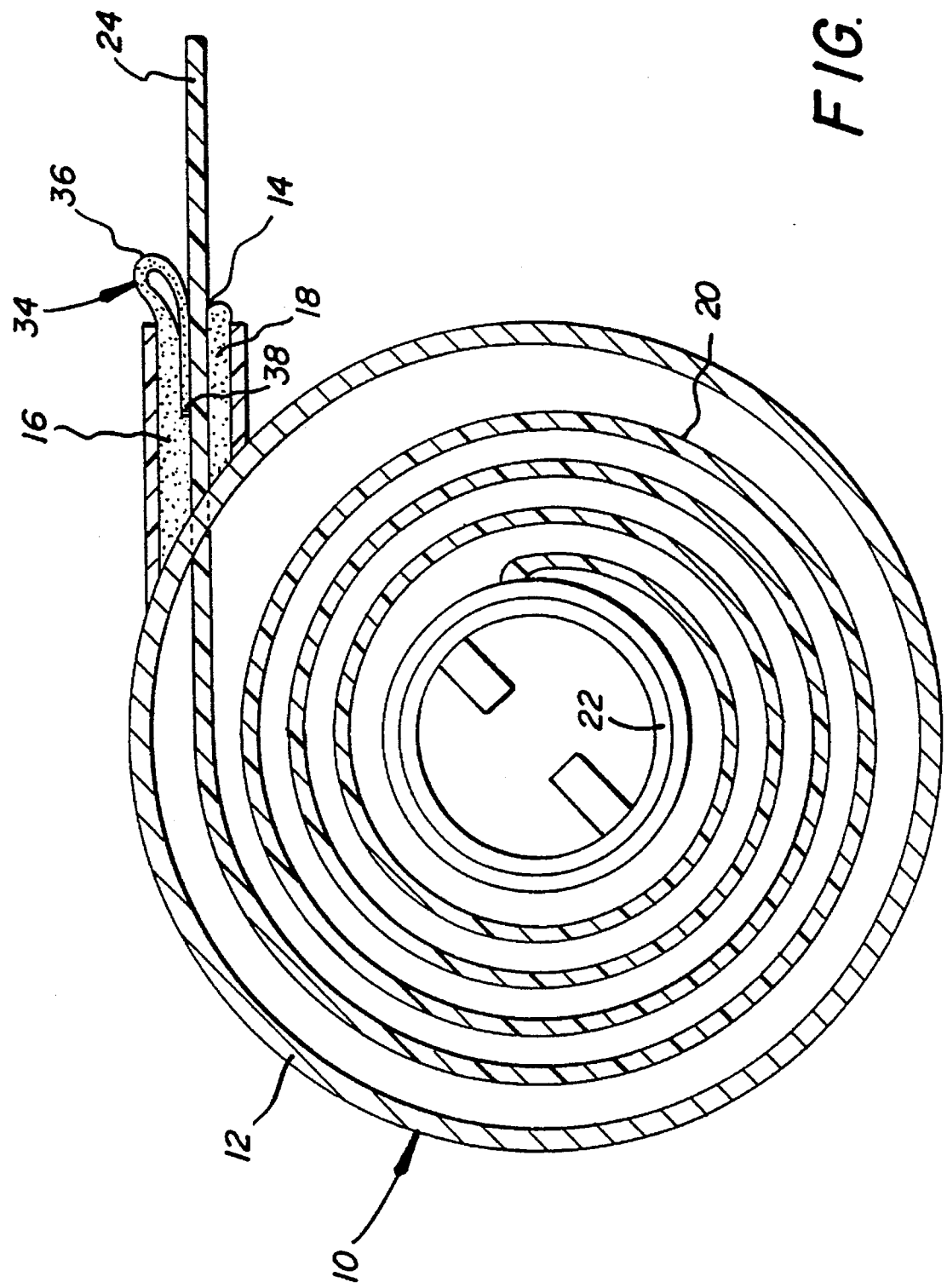
FIG. 3 is a cross-section view of a film cartridge with an exposed-film indicator according to an alternate embodiment of the invention, showing the exposed-film indicator in an original mode which indicates that a filmstrip inside the cartridge shell is fresh or unexposed.
Figure 4:
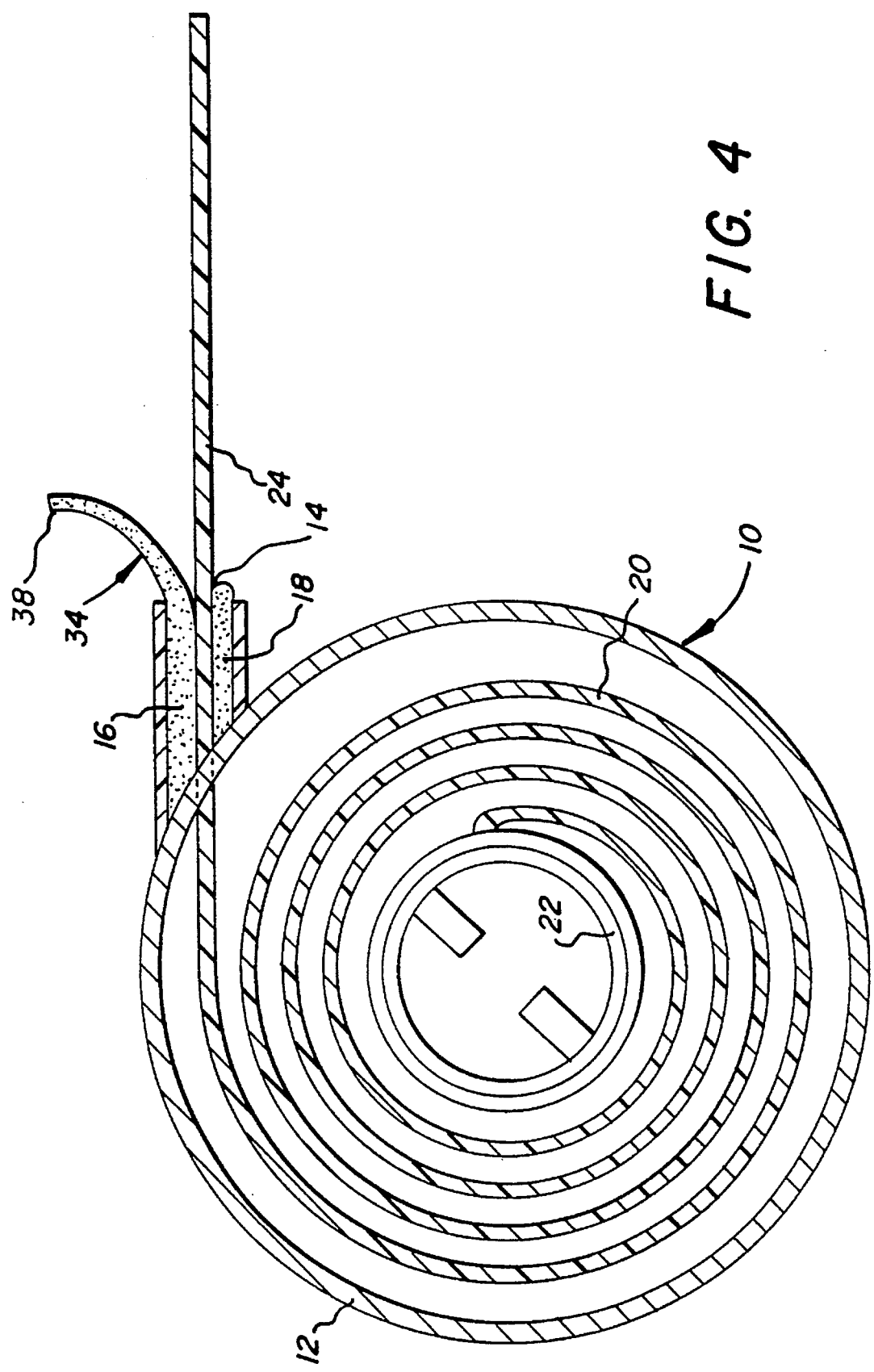
FIG. 4 is a cross-section view similar to FIG. 3, showing the exposed-film indicator in a second mode which indicates that the filmstrip inside the cartridge shell is exposed or used.

According to an alternate embodiment of the invention, a folded-over resilient tab 34 is an integral extension of the upper plush pad 16 as shown in FIGS. 3 and 4. The plush tab 34 partly protrudes from the slot 14 in the form of an external loop 36 and has a free end portion 38 positioned inside the slot 14 between the upper plush pad 16 and the film leader 24 to be frictionally dragged by the film leader to unfold the loop as the film leader is moved outwardly from the slot. See FIG. 4. Thus, the loop 36 when originally folded provides a visible indication that the filmstrip 20 is fresh or unexposed and when unfolded provides a visible indication that the filmstrip is exposed or used.

The invention has been described with reference to a preferred embodiment. However, it will be appreciated that variations and modifications can be effected by a person of ordinary skill in the art without departing from the scope of the invention.

PARTS LIST 10. film cartridge
12. cartridge shell
14. film egress slot
16. upper plush pad
18. lower plush pad
20. filmstrip
22. film spool
24. film leader
26. folded-over tab
28. tab loop
30. secured tab end portion
32. free tab end portion
34. plush tab
36. tab loop
38. free tab end portion

What is claimed is:

1. A film cartridge comprising a cartridge shell having a film egress slot, a filmstrip located inside said cartridge shell with a film leader to be moved outwardly through said film egress slot, and an exposed-film indicator, is characterized in that:

said exposed-film indicator includes folded-over resilient indicator means partly protruding from said film egress slot in the form of an external loop to be unfolded by said film leader as the film leader is moved outwardly from the film egress slot, whereby said loop when unfolded provides a visible indication of film use.

2. A film cartridge as recited in claim 1, wherein said indicator means is an integral extension of a light-trapping plush located inside said film egress slot.

3. A film cartridge as recited in claim 2, wherein said integral extension of said light-trapping plush has a free end portion positioned inside said film egress slot to be dragged by said film leader to unfold said loop when the film leader is moved outwardly from the film egress slot.

4. A film cartridge as recited in claim 1, wherein said indicator means has one end portion held in place inside said film egress slot and another end portion inside the film egress slot which is free to be dragged by said film leader to unfold said loop when the film leader is moved outwardly from the film egress slot.

5. A film cartridge comprising a cartridge shell having a film egress slot, a filmstrip located inside said cartridge shell with a film leader to be moved outwardly through said film egress slot, and an exposed-film indicator, is characterized in that:

said exposed-film indicator is a folded-over resilient tab partly protruding from said film egress slot in the form of an external loop with one end portion held in place inside the film egress slot and another end portion inside the film egress slot which is free to be dragged by said film leader to unfold said loop as the film leader is moved outwardly from the film egress slot, whereby said loop when unfolded provides a visible indication of film use.

* * * * *